United States Patent
McCormick et al.

(10) Patent No.: US 7,031,651 B2
(45) Date of Patent: Apr. 18, 2006

(54) SYSTEM AND METHOD OF MATCHING TEACHERS WITH STUDENTS TO FACILITATE CONDUCTING ONLINE PRIVATE INSTRUCTION OVER A GLOBAL NETWORK

(75) Inventors: Christopher McCormick, Boston, MA (US); Alena Shtessel, Boston, MA (US); Richard Sollom, Cambridge, MA (US); Molly Lim, Boston, MA (US)

(73) Assignee: Englishtown, Inc., Cambridge, MA (US)

( * ) Notice: Subject to any disclaimer, the term of this patent is extended or adjusted under 35 U.S.C. 154(b) by 300 days.

(21) Appl. No.: 09/908,966

(22) Filed: Jul. 19, 2001

(65) Prior Publication Data

US 2002/0064767 A1 May 30, 2002

Related U.S. Application Data

(60) Provisional application No. 60/219,897, filed on Jul. 21, 2000.

(51) Int. Cl.
*G09B 3/00* (2006.01)

(52) U.S. Cl. .................. 434/350; 434/157; 434/322; 434/118; 434/323; 434/362; 706/927; 715/751

(58) Field of Classification Search ............... 434/323, 434/365, 350, 336, 156, 157, 322; 705/8; 709/223; 715/751–759; 704/8; 706/927
See application file for complete search history.

(56) References Cited

U.S. PATENT DOCUMENTS

| 4,310,317 A | 1/1982 | Nomura et al. |
|---|---|---|
| 4,375,080 A | 2/1983 | Barry et al. |
| 4,538,993 A | 9/1985 | Krumholz |
| 4,877,408 A | 10/1989 | Hartsfield |
| 5,010,495 A | 4/1991 | Willetts |
| 5,263,869 A | 11/1993 | Ziv-El |
| 5,310,349 A | 5/1994 | Daniels et al. |
| 5,727,950 A | 3/1998 | Cook et al. |
| 5,810,598 A | 9/1998 | Wakamoto |
| 5,885,083 A | 3/1999 | Ferrell |
| 5,904,485 A | 5/1999 | Siefert |
| 5,957,698 A | 9/1999 | Dean et al. |
| 5,974,446 A | 10/1999 | Sonnenreich et al. |

(Continued)

FOREIGN PATENT DOCUMENTS

| EP | 1 052 828 A2 | 11/2000 |
|---|---|---|
| WO | WO 99/32201 | 7/1999 |
| WO | WO 00/04478 | 1/2000 |
| WO | 01/22382 A1 | 3/2001 |

OTHER PUBLICATIONS

News releases from Englishtown.com.*
USPTO Office Action, mailed on Apr. 15, 2003, for co-pending U.S. Appl. No. 09/909,137, (9 pages).

(Continued)

*Primary Examiner*—Derris H. Banks
*Assistant Examiner*—Dmitry Suhol
(74) *Attorney, Agent, or Firm*—Testa, Hurwitz & Thibeault, LLP

(57) ABSTRACT

Described are a system and method for facilitating private instruction over a network between a teacher and a student. Profile information is received from each student who registers for a private course. Each student who registers for a private course is included in a list of students who are unassigned to a teacher. Each teacher who is able to teach a private course has access over the network to the list of students and the profile information of the students. One of the teachers who is able to teach a given private course is assigned to one of the students in the list of students enrolled in that given private course based upon the profile information of that student.

12 Claims, 16 Drawing Sheets

U.S. PATENT DOCUMENTS

| | | | |
|---|---|---|---|
| 5,978,648 A | 11/1999 | George et al. | |
| 6,014,134 A | 1/2000 | Bell et al. | |
| 6,024,577 A | 2/2000 | Wadahama et al. | |
| 6,029,043 A | 2/2000 | Ho et al. | |
| 6,030,226 A | 2/2000 | Hersh | |
| 6,061,681 A | 5/2000 | Collins | |
| 6,074,213 A | 6/2000 | Hon | |
| 6,074,216 A | 6/2000 | Cueto | |
| 6,076,828 A | 6/2000 | McGill | |
| 6,141,529 A | 10/2000 | Remschel | |
| 6,146,148 A | 11/2000 | Stuppy | |
| 6,149,441 A | 11/2000 | Pellegrino et al. | |
| 6,155,840 A | 12/2000 | Sallette | |
| 6,160,987 A | 12/2000 | Ho et al. | |
| 6,164,975 A | 12/2000 | Weingarden et al. | |
| 6,190,178 B1 | 2/2001 | Oh | |
| 6,201,948 B1 | 3/2001 | Cook et al. | |
| 6,208,832 B1 | 3/2001 | Remschel | |
| 6,236,975 B1 * | 5/2001 | Boe et al. | 705/7 |
| 6,261,103 B1 | 7/2001 | Stephens et al. | |
| 6,270,351 B1 | 8/2001 | Roper | |
| 6,287,125 B1 | 9/2001 | Dorcely | |
| 6,301,462 B1 | 10/2001 | Freeman et al. | |
| 6,302,698 B1 | 10/2001 | Ziv-El | |
| 6,325,632 B1 | 12/2001 | Chao et al. | |
| 6,334,779 B1 | 1/2002 | Siefert | |
| 6,336,813 B1 | 1/2002 | Siefert | |
| 6,347,333 B1 | 2/2002 | Eisendrath et al. | |
| 6,358,053 B1 | 3/2002 | Rosenfield et al. | |
| 6,381,444 B1 | 4/2002 | Aggarwal et al. | |
| 6,386,883 B1 | 5/2002 | Siefert | |
| 6,411,796 B1 | 6/2002 | Remschel | |
| 6,493,690 B1 | 12/2002 | Bertrand et al. | |
| 6,505,031 B1 | 1/2003 | Slider et al. | |
| 6,544,042 B1 * | 4/2003 | Lippman | 434/322 |
| 6,547,568 B1 * | 4/2003 | Yamano | 434/323 |
| 2001/0018178 A1 | 8/2001 | Siefert | |
| 2001/0039002 A1 | 11/2001 | Delehanty | |
| 2001/0055749 A1 | 12/2001 | Siefert | |
| 2002/0013836 A1 | 1/2002 | Friedman et al. | |
| 2002/0051958 A1 | 5/2002 | Khalsa | |
| 2002/0055088 A1 | 5/2002 | Feig | |
| 2002/0058234 A1 | 5/2002 | West et al. | |
| 2002/0087416 A1 | 7/2002 | Knutson | |
| 2002/0115044 A1 | 8/2002 | Shpiro | |
| 2002/0138590 A1 | 9/2002 | Beams et al. | |
| 2002/0150869 A1 | 10/2002 | Shpiro | |
| 2002/0188583 A1 | 12/2002 | Rukavina et al. | |
| 2002/0188679 A1 | 12/2002 | Matous et al. | |
| 2003/0039948 A1 * | 2/2003 | Donahue | |
| 2003/0054328 A1 | 3/2003 | Stuppy et al. | |
| 2004/0009461 A1 * | 1/2004 | Snyder et al. | |

OTHER PUBLICATIONS

Milton et al. "Collaborative Foreign Language Learning on the Internet for Primary Age Children: Problems and a Solution," *Education Technology & Society*, vol. 3, No. 3, Jul. 2000, pp. 286–292.

Patent Cooperation Treaty, International Search Report, International Application No. PCT/US 01/22921, mailed on Jul. 15, 2002, 6 pages.

* cited by examiner

NAVIGATION VIEWS

Next: direct to Master/school/private/schedule

[Browser toolbar: Back, Forward, Stop, Refresh, Home, Search, Favorite, History, Mail, Print]

Address: http://www.englishtown.com/master/school/

Do you want to study in the US?
Click now to improve your TOEFL score.

International Language Schools englishtown.com
The place to learn English

| WELCOME | SCHOOL | COMMUNITY | TESTS | RESOURCES | TEACHERS |

Monday

- MY COURSES
- SCHOOL

- Tour the school

- Course programs
- General English
- Business English
- Test Preparation
- Industry-specific English

- Test my level of English

- Summary and pricing

- Register now!
- Free self-study courses
- PREMIUM teacher-led courses

- Meet us
- Our students
- Our teachers

- Why study online?

- Just like a real school

- Why study with us?

Scheduling your private lessons

When would your prefer to meet with your teacher? Just follow these 3 easy steps:

1. Tell us your local time.
2. Choose to meet your teacher in a text of voice discussion room.
3. Tell us when you'd prefer to meet with your teacher.

>Click here for further details next

FIG. 3A

Next: direct to Master/school/private/schedule

Address: http://www.englishtown.com/master/school/

Do you want to study in the US? Click now to improve your TOEFL score.

International Language Schools englishtown.com
The place to learn English

WELCOME | SCHOOL | COMMUNITY | TESTS | RESOURCES | TEACHERS

Monday

- MY COURSES
- SCHOOL
  - Tour the school
  - Course programs
  - General English
  - Business English
  - Test Preparation
  - Industry-specific English
  - Test my level of English
  - Summary and pricing
  - Register now!
  - Free self-study courses
  - PREMIUM teacher-led courses
  - Meet us
  - Our students
  - Our teachers
  - Why study online?
  - Just like a real school
  - Why study with us?

How to schedule your private lessons

Tell us your local time. This will help us in accurately scheduling your private lessons so both you and your teacher know exactly what time to meet.

Select Voice or Text discussion. You'll meet your teacher in a Voice or Text discussion room. This means your teacher will conduct the lesson either orally or by typing on the keyboard. Click here for system requirements.

Tell us when you'd prefer to meet with your teacher. Check off the days and times that would work best for you. Each lesson lasts 50 minutes.

Confirm your schedule. Your teacher will contact you via email within 3 days. You and your teacher will then arrange a specific date and time for your first lesson. Each time you complete one or the 4 units, you will meet with your teacher.

Start your studies. Remember, you can begin your course right away.

next

FIG. 3B

| WELCOME | SCHOOL | COMMUNITY | TESTS | RESOURCES | TEACHERS |

Monday

SCHOOL HEAVIER TOOLS

MY COURSES

- School services
- Instructions
- Contact advisor
- Orientation
- Student chat
- Student forum
- Library
- Frequently asked questions
- Course extras
- Level tests
- Pair games
- Register now
- Personal file
- Logout

PRIVATE LESSONS

Scheduling your private lessons

1. What's your local time?

Please select your approximate current local time. This will help in accurately scheduling your private lessons.

[17:40 ▼] —200

2. Voice or text discussion?

Where would you like to meet your teacher? You can choose Voice discussion, Text discussion, or both!

○ Voice discussion　⊙ Text discussion　○ Both　}—204

3. What time is best for you?

When would you prefer to meet with your teacher? Your teacher will contact you to confirm the exact date and time of each lesson. Select all days and times that are possible for you. (All times are local.)

☑ Mon　[09:00-12:00 ▼]
☐ Tue　[Select time ▼]
☑ Wed　[15:00-18:00 ▼]
☐ Thu　[Select time ▼]
☑ Fri　[12:00-15:00 ▼]
☐ Sat　[Select time ▼]
☐ Sun　[Select time ▼]

}—208

[Submit]

FIG. 3C

⇦ ⇨ ⊗ 🔄 🏠 🔍 ⭐ 🕐 ✉ 🖨
Back Forward Stop Refresh Home Search Favorite History Mail Print Address: http://www.englishtown.com/master/school/

Do you want to study in the US?
Click now to improve your TOEFL score.

englishtown.com *International Language Schools*
The place to learn English

| WELCOME | SCHOOL | COMMUNITY | TESTS | RESOURCES | TEACHERS |

Monday

🏠 MY COURSES
⚙ SCHOOL

- Tour the school

- Course programs
  General English
  Business English
  Test Preparation
  Industry-specific
  English

- Test my level of English

- Summary and pricing

- Register now!
  Free self-study courses

- PREMIUM teacher-led courses

- Meet us
  Our students
  Our teachers

- Why study online?

- Just like a real school

- Why study with us?

Thank you Rick!

We've received your Information

Your teacher will contact you at the following address within 3 days to arrage the day and time for you first private lesson: rick@englishtown.com If you haven't heard back within 3 days, please contact private@englishtown.com.

In the meantime, you should begin Unit 1 of your course. Just go to MY COURSES and click on your course.

Enjoy your private English course!

>Go to My courses

Auto-fill first name of student and his email address.

New email account; do not use advisor for private lesson scheduling: private@englishtown.com

FIG. 3D

FIG. 3E shopping cart

| WELCOME | SCHOOL | COMMUNITY | TESTS | RESOURCES | TEACHERS |

Monday

☐ TRACKING
☐ GENERAL
☐ COMMUNITY
☐ SCHOOL

★ Admissions
  ⋆ Pending Orders
  ⋆ New Orders
  ⋆ Archived Orders

★ Private Course Management

★ Change Demo PWs

★ Course Tracking
  ⋆ Free
  ⋆ Upgraded
  ⋆ Premium
  ⋆ Private

New Private Students

| Username | Course | Country | Enroll Date |
|---|---|---|---|
| afun | Beginner B | Russia | Jul 1 2000 |
| acrazy | Intermediate A | United States | Jul 7 2000 |
| lwexler | Beginner B | Uzbekistan | Jul 7 2000 |
| astudent | Elementary C | Romania | Jul 10 2000 |

FIG. 4A shopping cart

| WELCOME | SCHOOL | COMMUNITY | TESTS | RESOURCES | TEACHERS |

Private Teacher Alena

Monday

📚 SCHOOL LOBBY
📖 MY COURSES

My Private Chatrooms

✏️ TEACHER TOOLS

▸ Text Chat
▸ Voice Chat

» Faculty forum

» Faculty lounge

My Private Students

» Private students

| Username | Course | Country | Enroll Date | Email |
|---|---|---|---|---|
| lwexler | Beginner B | Uzbekistan | Jul 7 2000 | lee.wexler@ef.com |
| astudent | Elementary C | Romania | Jul 10 2000 | alena@student.com |

» Registrar
  » Courses
  » Students

» Curriculum
  » Faculty manual

» Discussions
  » Rooms
  » Schedule & key
  » Chat administration

FIG. 4B

Student: Lee Wexler

Username: lwexler
Course: Beginner B
Enroll Date: Fri Jul 7 2000
Location: Brookline, Uzbekistan
Age/Gender: 26 / M
Email: lee.wexler@ef.com

Preferences:
Chat: Text and Voice
Time Difference: student is 4 hrs behind

| Student's Local Time | New York Time |
|---|---|
| Mon: 09:00 - 12:00 | Mon: 13:00 - 16:00 |
| Tue: 09:00 - 12:00 | Tue: 13:00 - 16:00 |
| Wed: 12:00 - 15:00 | Wed: 16:00 - 19:00 |
| Thu: 12:00 - 15:00 | Thu: 16:00 - 19:00 |
| Fri: 21:00 - 24:00 | Sat: 01:00 - 04:00 |

Lessons Completed: [2 ▼] out of 4

Teacher Notes:
Lesson 1: voice chat - went great!
Talked about nouns.

Lesson 2: text chat - went good.
Lee had questions about verbs.

[Update] [Close]

FIG. 4C

Private Students

| Username | Course | Country | Enroll Date | Teacher |
|---|---|---|---|---|
| afun | Beginner B | Russia | Jul 10 2000 | None |
| acrazy | Intermediate A | United States | Jul 7 2000 | Alena Who |
| lwexler | Beginner B | Uzbekistan | Jul 7 2000 | Alena Shtessel |
| astudent | Elementary C | Romania | Jul 10 2000 | Alena Shtessel |

WELCOME | SCHOOL | COMMUNITY | TESTS | RESOURCES | TEACHERS shopping cart

Monday

☐ TRACKING
☐ GENERAL
☐ COMMUNITY
☐ SCHOOL

Admissions
* Pending Orders
* New Orders
* Archived Orders

Private Course Management

Change Demo PWs

Course Tracking
* Free
* Upgraded
* Premium
* Private

FIG. 5B

Student: Alena Fun

| | |
|---|---|
| Username: | afun |
| Course: | Beginner B |
| Enroll Date: | Mon Jul 10 2000 |
| Location: | Chelyabinsk, Russia |
| Age/Gender: | 25 / F |
| Email: | alena@fun.net |

Preferences:

<u>Chat</u>: Text

<u>Time Difference</u>: student is 17 hrs behind

| <u>Student's Local Time</u> | <u>New York Time</u> |
|---|---|
| Wed: 12:00 - 15:00 | Thu: 05:00 - 08:00 |
| Fri: 18:00 - 21:00 | Sat: 11:00 - 14:00 |
| Sat: 09:00 - 12:00 | Sun: 02:00 - 05:00 |

Teacher: Select a teacher ▽ — 232

Select a teacher
Alena Shtessel
Alena Test
Alena Who

[Assign] [Close]
  |
 236

FIG. 5C

SYSTEM AND METHOD OF MATCHING TEACHERS WITH STUDENTS TO FACILITATE CONDUCTING ONLINE PRIVATE INSTRUCTION OVER A GLOBAL NETWORK

RELATED APPLICATION

This application claims the benefit of the filing date of co-pending U.S. Provisional Application, Ser. No. 60/219,897, filed Jul. 21, 2000, entitled "Matching Teachers With Students For Conducting Private Courses Over The Internet," the entirety of which provisional application is incorporated by reference herein.

FIELD OF THE INVENTION

The invention relates generally to online educational courses. More specifically, the invention relates to a system and method for matching teachers with students for conducting online private instruction over a network.

BACKGROUND

Traditionally, the teaching of foreign languages has taken place in the school classroom where a teacher instructed students in their presence and measured their progress through written and oral examinations. With the advent of computer networking, the classroom has moved from the schools to the Internet, a global network of networks, particularly the World Wide Web ("Web"). Accordingly, students now can learn to speak and write in a foreign language online, i.e., over the network, by using a computer system to connect to servers and Web sites on the network that offer language-learning courses and software.

People have long recognized that private tutorship, in which the student has his or her own teacher, is a highly effective method for learning. Whereas in classrooms with one teacher for multiple students, the attention of the teacher is divided among students, and some students fail to participate actively in the lessons.

Administering private tutorship over a global network, however, becomes more complicated as the number of students and teachers who want to participate in online private instruction grows. The difficulties of coordinating such private tutorship increase further because these teachers and students can live anywhere the world, so long as they have access to the global network. Large time differences between some teachers and their students create the unwanted possibility of inconvenient matches for one or both of them.

Thus, it is desirable to provide a system and a method that can generate effective matches between teachers and students to facilitate teaching online private instruction over a global network.

SUMMARY OF THE INVENTION

The invention features a method for facilitating private instruction over a network (e.g., LAN, WAN, Intranet, Internet, or World Wide Web) between a teacher and a student. Profile information is received from each student who registers for a private course. An example of a private course is a course for teaching a foreign language (e.g., English to non-English speaking students). Each student profile information includes identifying a preferred time of day and a preferred day of the week for conducting a discussion session with a teacher. Each student who registers for a private course is added to a list of students who are unassigned to a teacher. In one embodiment, each student is placed in the list of students in an order based upon an enrollment date of each student.

The method includes enabling access over the network to the list of students and the profile information of the students by each teacher who is able to teach a private course. One of the teachers who is able to teach a given private course is assigned to one of the students in the list of students enrolled in that given private course based upon the profile information of that student. In one embodiment, the teacher selecting a student from the list of students accomplishes the assignment. In another embodiment, an administrator assigns one teacher from a list of teachers to one of the students. The teacher assigned to the one student can be in a different time zone than that student.

After a teacher is assigned to a student, the teacher and student communicate to negotiate terms related to conducting the given private course. One negotiated term is when a discussion session is to occur between the assigned teacher and the student. Embodiments of the method include opening a voice channel, a text channel, or both between the assigned teacher and student for conducting discussion sessions.

In another aspect, the invention features a server system for facilitating private instruction over a network between a teacher and a student. An input system receives student profile information from each student who registers for a private course. A queue holds students who are registered for a private course, but who are unassigned to a teacher. The queue of students and the profile information of the students are accessible over the network by each client system that is operated by a teacher who is able to teach a private course. Software executing on the server system assigns a teacher who is able to teach a given private course to one of the students in the queue of students registered in that given private course based upon the profile information of that student.

In one embodiment, a given teacher who is able to teach the given private course operates the client system. The software assigns the given teacher to a student in response to input from the client system indicating that the teacher selected that student.

In another embodiment, an administrator operates the client system. The software assigns a teacher to a student in response to input from the client system indicating that the administrator matched that teacher to that student.

In another aspect, the invention features an article of manufacture having computer-readable program means embodied thereon for facilitating private instruction over a network between a teacher and a student. The article comprises computer-readable program means for receiving student profile information from each student who registers for a private course and computer-readable program means for adding each student who registers for a private course to a list of students who are unassigned to a teacher.

The article of manufacture also includes computer-readable program means for enabling access to the list of students and the profile information of the students over the network by each teacher who is able to teach a private course, and computer-readable program means for assigning one of the teachers who is able to teach a given private course to one of the students in the list of students registered in that given private course based upon the profile information of that student.

In one embodiment, the computer-readable program means for assigning one of the teachers to one of the students in the list of students assigns that one teacher to that one student in response to input from a client system operated by that one teacher indicating that that teacher selected that one student.

In another embodiment, the computer-readable program means for assigning one of the teachers to one of the students in the list of students assigns that one teacher to that one student in response to input from a client system operated by an administrator indicating that the administrator matched that one teacher with that one student.

BRIEF DESCRIPTION OF THE DRAWINGS

The invention is pointed out with particularity in the appended claims. The objectives advantages of the invention described above, as well as further objectives and advantages of the invention, may be better understood by reference to the following description taken in conjunction with the accompanying drawings, in which:

FIGS. 3A–3E are embodiments of views (or screen displays) that can be presented to a student who registers to take a private course over the network;

FIGS. 4A–4C are embodiments of views presented to a teacher who is teaching private courses to students over the network; and FIGS. 5A–5E are embodiments of views presented to course administrators for matching teachers with students.

DESCRIPTION OF THE INVENTION

Figure 1:
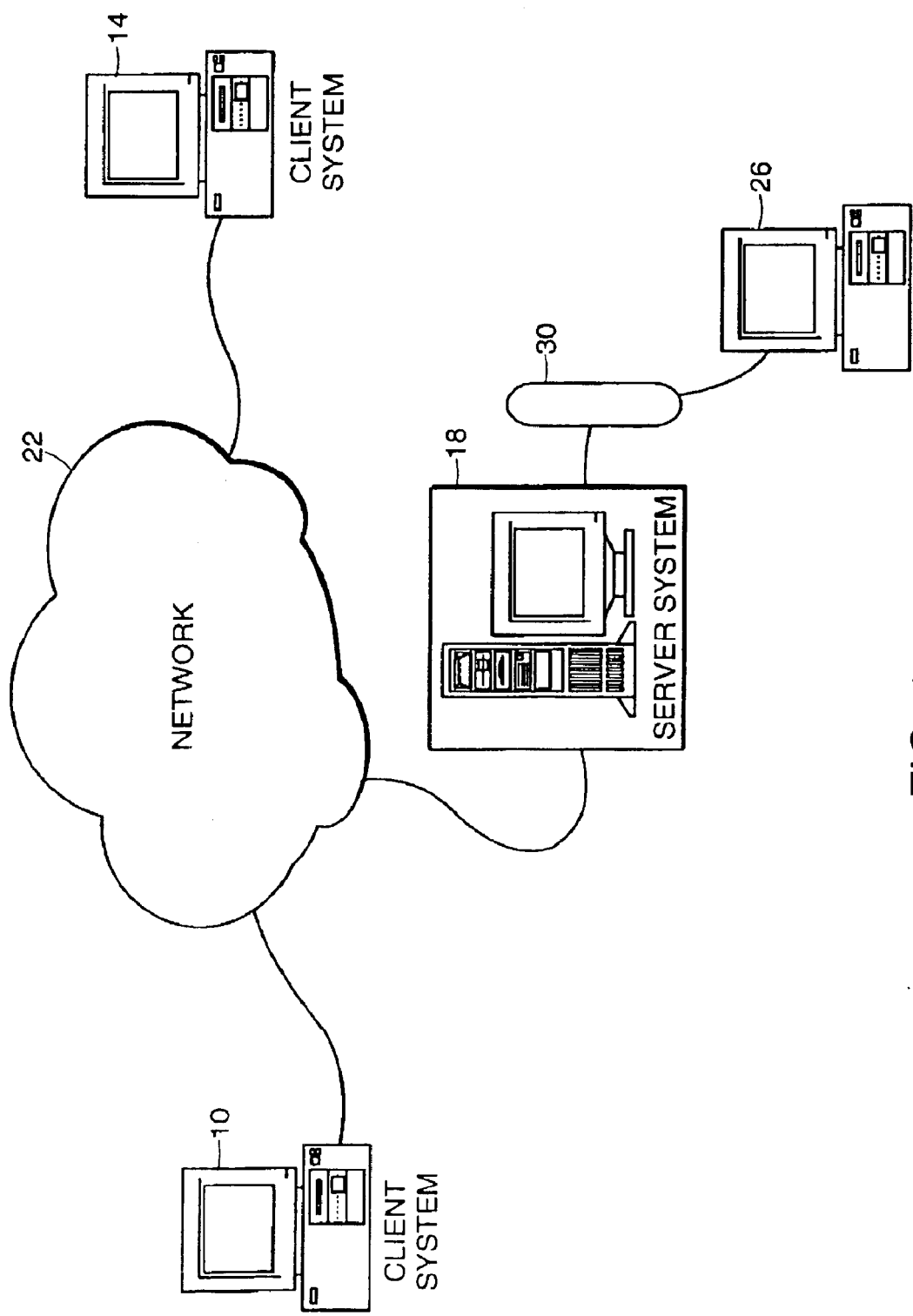
FIG. 1 is a block diagram of an embodiment of a networking system embodying an online private instruction system for matching teachers with students in accordance with the principles of the invention.

FIG. 1 shows a networking system 2 embodying an online private instruction system that facilitates teaching private courses by matching private teachers with students in accordance with the principles of the invention. The networking system 2 includes a plurality of client systems 10, 14 in communication with a server system 18 over a network 22 and a client system 26 in communication with the server system 18 over a local area network (LAN) 30. The network 22 over which the client systems 10, 14 and the server system 18 communicate can be a local area network (LAN), a wide area network (WAN), or a global network of networks such as the Internet and the World Wide Web. Accordingly, the client systems 10, 14, 26 (and their users) can be geographically dispersed in different time zones. For example, the client system 10 can be in Asia, the client system 14 in Europe, and the client system 26 in North America. Users of the client systems 10, 14, 26 can access the online private instruction system at any time. In effect, the online private instruction system is open twenty-four hours a day, seven days a week.

The client systems 10, 14 and the server system 18 can connect to the network 22 through a variety of connections including standard telephone lines, LAN or WAN links (e.g., T1 T3, 56 kb, X.25), broadband connections (ISDN, Frame Relay, ATM), and wireless connections. Connections can be established using a variety of communication protocols (e.g., HTTP, TCP/IP, IPX, SPX, NetBIOS, Ethernet, RS232, and direct asynchronous connections).

Each client system 10, 14, 26 can be any processor-based device (e.g., a personal computer) capable of displaying Web documents (e.g., HTML, XML Web pages) and communicating with the server system 18 according to a protocol that transmits such Web documents. Each client system 10, 14, 26 includes a display screen, a keyboard, a pointing device (e.g., a mouse, trackball, touch-pad, touch-screen, etc), a microphone, one or more speakers, a processor, and persistent storage (not shown).

The operating system of each client system 10, 14, 26 can be one of a variety of windows-based platforms including but not limited to WINDOWS 3.x, WINDOWS 95, WINDOWS 98, WINDOWS NT 3.51, WINDOWS NT 4.0, Macintosh, and Unix, DOS, Linux, and WINDOWS CE for windows-based terminals. The operating system produces a graphical user interface through which the user of the client system 10, 14, 26 can interact with the display (e.g., by inputting information, clicking on icons or menu items, opening and closing windows, and scrolling a displayed windows) using the keyboard or the pointing device.

The client systems 10, 14, 26 include browser software ("browser"), such as Netscape Navigator™ 4.0 produced by Netscape Communications of Mountain View, Calif., and MICROSOFT INTERNET EXPLORER™ 4.0 produced by Microsoft Corporation of Redmond, Wash. In general, a browser sends requests over the network 22 to retrieve a Web document or Web page from a Web server (e.g., Web server 36 described further below). The browser then processes the downloaded Web page with any accompanying graphics files and applets, and displays the results on the display screen of the client system 10, 14, 26.

The server system 18 includes one or more server computing machines 20, 20' (generally server machine 20). Each server machine 20 can run one or more different server software packages (i.e., servers) to provide different services to users of the client systems 10, 14, 26 over the network 22. One of the server machines 20, 20' runs server software to operate as a Web server. This Web server maintains a Web site, which has a plurality of Web pages related to the online private instruction system and is accessible world wide by client system users who are interested in taking, teaching, or administering private courses. At the Web site, the online private instruction system offers various private educational courses such as general English and Business English. In a private course, each student has his or her own teacher for lessons and writing assignments. The online private instruction system can also offer courses other than private course. In brief overview, a student who visits the Web site can choose to enroll in one of the offered private courses, and after the student enrolls in a private course, that student is matched with a private teacher in accordance with the principles of the invention.

More specifically, each private course includes one or more teaching units, one or more self-study sessions, and one or more discussion sessions. In one embodiment, the private course offers to teach a language, such as English, to students who wish to learn that language online. Although described throughout this detailed description with reference to private courses for teaching English, it is to be understood that the principles of the invention apply to private courses that teach of other languages (e.g., French) and other types of subject matter (e.g., Algebra).

For a private course that teaches a language, each teaching unit can focus on a particular aspect of the language, such as nouns, verbs, grammar, vocabulary, pronunciations, special topics, and particular social situations, and the like. Also, each teaching unit of the private course can start with an activity that requires the student to navigate the World Wide Web to research a particular topic, visit a Web site, or perform a specific task. For self-study lessons, the student studies online to improve, for example, vocabulary, grammar, reading, and listening skills in accordance with the teaching unit that the student is currently working on. Each self-study lesson can include an exercise that shows the student's score and the time spent at the exercise.

During a discussion session, the teacher and the student have one-to-one communications using voice chat, text chat, or both. When the teacher and student are talking to each other, a voice channel opens between the client system operated by the teacher and the client system operated by the student and a client system operated by that student. Thus, voice communications are peer-to-peer (i.e., the voice communications do not traverse the server system 18). Similarly, text communication between the client systems of the teacher and student are peer-to-peer.

In one embodiment, there is one discussion session for each teaching unit and the discussion session occurs after the student completes the teaching unit. Other embodiments of private courses can have more or fewer discussion sessions. When a private course is for teaching a foreign language (i.e., foreign to the student), the teacher typically leads the discussion session in that foreign language and tailors the lesson for the particular student. Students may find that such discussion sessions effectively improve their skills in the foreign language.

A private course for teaching a foreign language can also have writing exercises that urge the student to improve his writing skills in that language by expressing opinions on a variety of topics. In these writing exercises, the student uses new vocabulary and grammar that have been learned n the teaching unit. The server system 18 sends a writing exercise Web page to the student. The Web page includes a blank region within which the student types in the writing sample. The student then submits the written assignment to the private teacher over the network. The server system delivers the writing sample to the teacher's e-mail address. The teacher reviews the writing sample and communicates with the student, e.g., on how to improve the writing, using any one of e-mail, text chat, or voice chat. For monitoring the student's progress, a private course can require the student to take quizzes at the completion of each teaching unit and a longer exam at the end of the private course. After the student completes the private course, the student may receive a certificate of completion.

Figure 2A:
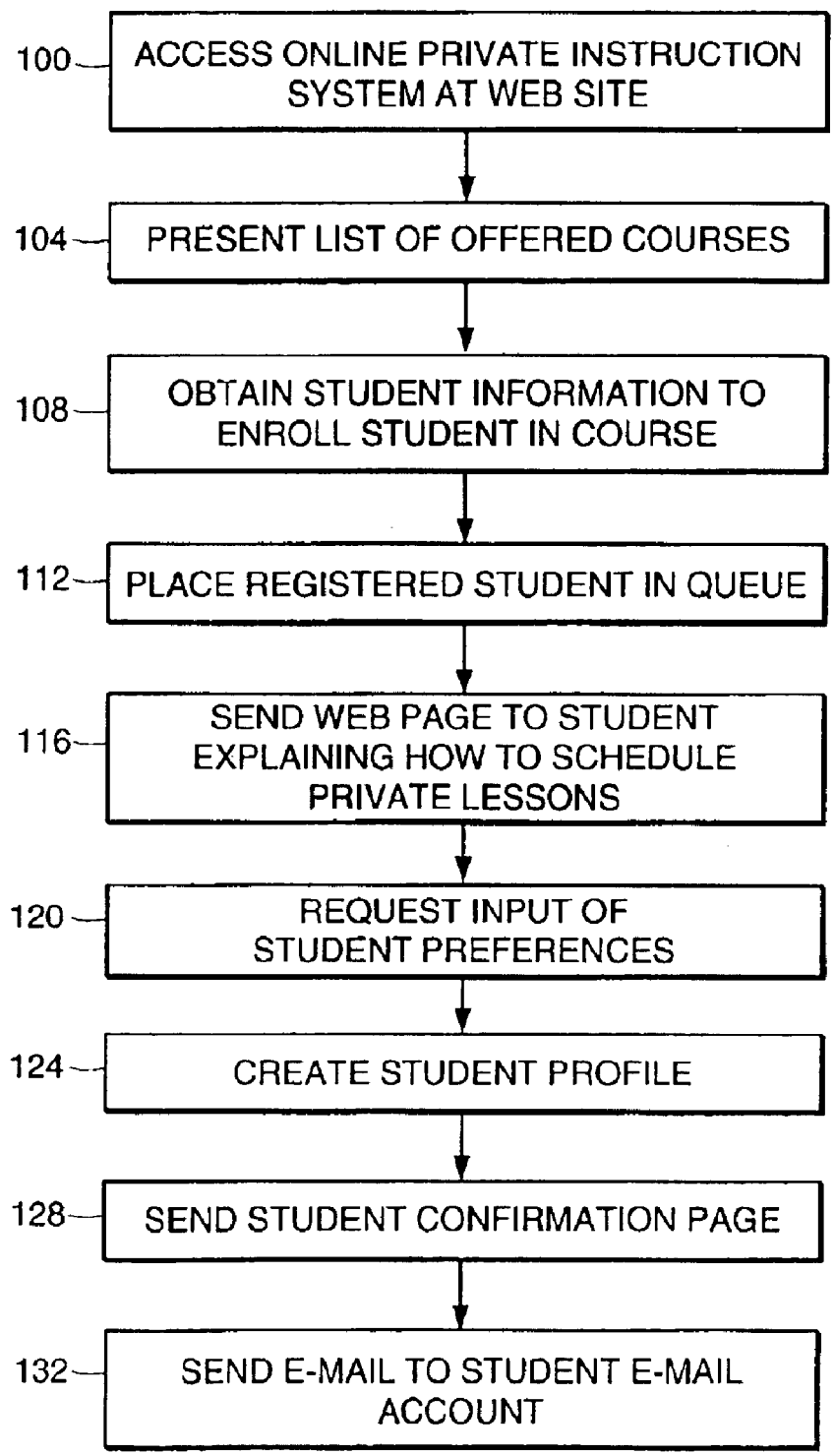
FIG. 2A is a flow diagram of an embodiment of a process by which students register for a private course online.
Figure 2B:
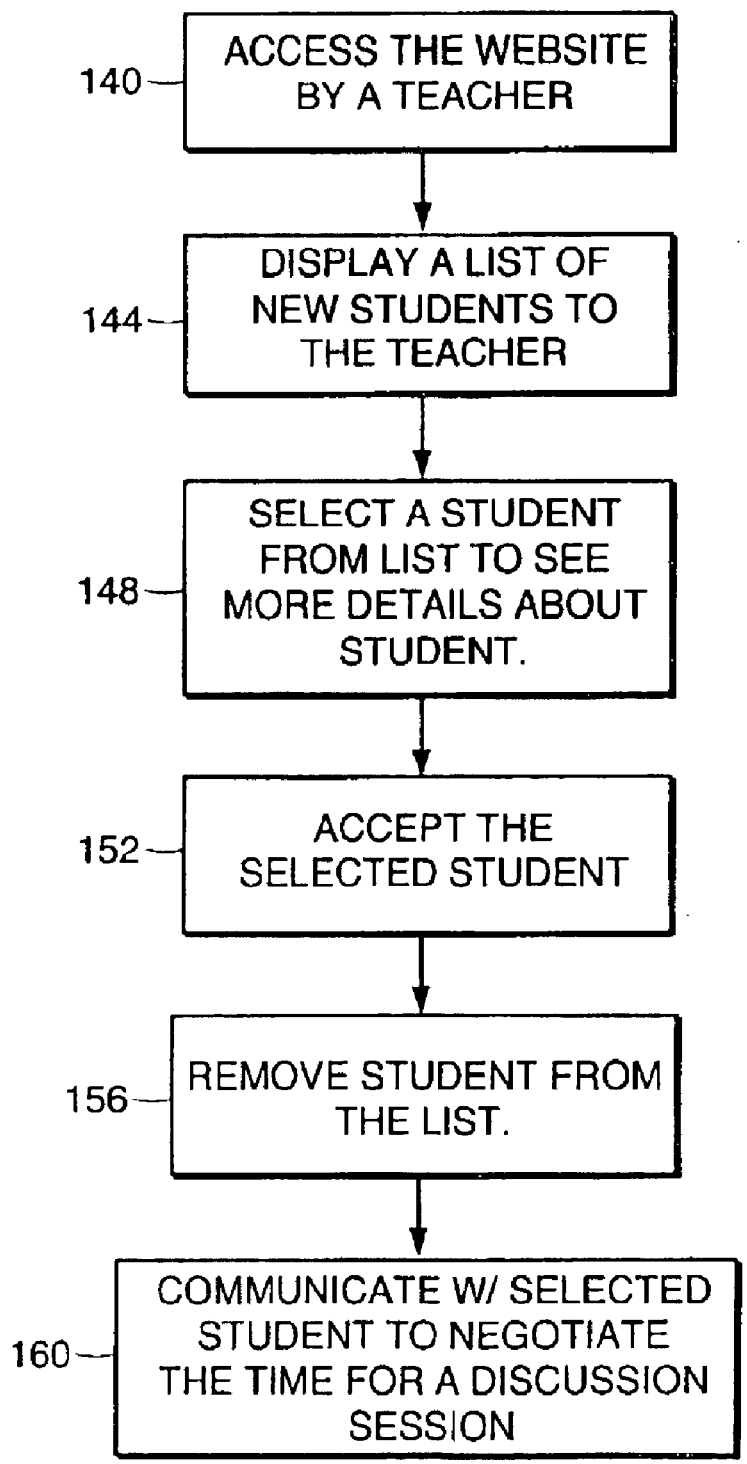
FIG. 2B is a flow diagram of an embodiment of a process by which a teacher selects a student for conducting discussion sessions associated with a private course.

FIGS. 2A–2B shows an embodiment of a process for matching teachers with students to conduct private courses over the network 22. For the purpose of describing the invention, assume that a student is using client system 10, a teacher is using client system 14, and an administrator of the online private instruction system is using client system 26. In practice, there are a plurality of students, teachers, and administrators who can access the online private instruction system provided by the server system 18 from various parts of the world, at all times of the day, and on every day of the week.

FIG. 2A shows an exemplary process by which the student registers for a private course online. The student using the client system 10 runs the browser and accesses (step 100) the server system 18 supporting the online private instruction system (i.e., visit a home page of the Web site that produces the online private instruction system). The Web site presents (step 104) a list of offered courses to the student in the form of a Web page that is downloaded to the client system 10.

After viewing the list of offered courses, the student opts to enroll in a private course and activates a link that causes the server system 18 to transmit a registration form to the client system 10. As part of the registration process, the server system 18 obtains (step 108) personal information of the student such as name and address. In one embodiment, the server system 18 also transmits a placement test to the student client system 10 to determine if the student is sufficiently proficient in the subject matter of the chosen private course. The server system 18 can also request that the student supply payment information (e.g., a credit card number) to purchase the private course. After the student has registered, the server system 18 places (step 112) the student into a queue. In one embodiment, the order of students in the queue (i.e. first in queue to last in queue) is from the least recently enrolled to the most recently enrolled.

The server system 18 sends (step 116) a Web page to the student that explains a process for scheduling private lessons with a teacher. An exemplary embodiment of the Web page is shown in FIG. 3A. This Web page tells the student what information to supply to schedule the private lessons. Such information includes the student's local time, how he would like to meet the teacher (i.e, by text chat, voice chat, or both), and the preferred day(s) of the week and preferred time of the day to meet the teacher. If the student desires help, the student clicks the appropriate link in the Web page (e.g., "Click her for further details" in FIG. 3A) and downloads another Web page (see FIG. 3B) with help information. When ready to schedule private lessons, the student activates another link (e.g., the "NEXT" button in FIG. 3A) to access another Web page (see FIG. 3C) that requests (step 120) input of the student's preferences for meeting his private teacher.

As shown in FIG. 3C, one embodiment of the online private instruction system asks the student to provide the student's local time, a preferred method of communicating with the teacher, and the preferred day(s) of the week and times of the day to meet the teacher. To facilitate entry of the local time, a drop down menu 200 presents a list of times from which the student chooses his local time. The list of times is dynamically generated based on the local time at the server system 18. For example, if the time at the server system 18 is 20:40, the drop down menu includes 24 one-hour entries, such as 20:40, 21:40, 22:40, 23:40, 0:40, and so on. Alternatively, the student can type in the local time into the text-input box. The Web page also asks the student to choose among voice discussion, text discussion, or both by selecting (i.e., clicking on) the appropriate input region 204. Also, the Web page presents a list 208 of the days of the week and corresponding drop-down menus for preferred times of the day for the student to identify the student's preferred times for private lessons.

Referring back to FIG. 2A, when the student completes entry and submits the preference information to the server system 18, the server system creates (step 124) a profile (or record) for the student with the student preference information. The server system 18 sends (step 128) the student a confirmation Web page indicating that the preference information has been received. The confirmation page can also provide information instructing the student to begin the first teaching unit and when to expect a teacher initiate contact with the student. The confirmation Web page provides a link to the page at which the student can begin the teaching unit.

Upon receiving the student's preference information, the server system 18 produces an e-mail account (if needed: the student may already have an account with the online private instruction system or a preferred e-mail mail account with another e-mail server). The server system 18 then sends (step 132) an e-mail message to the student account welcoming the student to the online school, giving instructions on the private course in which he has registered, and inviting him to an online orientation through text or voice chat.

Figure 3E:
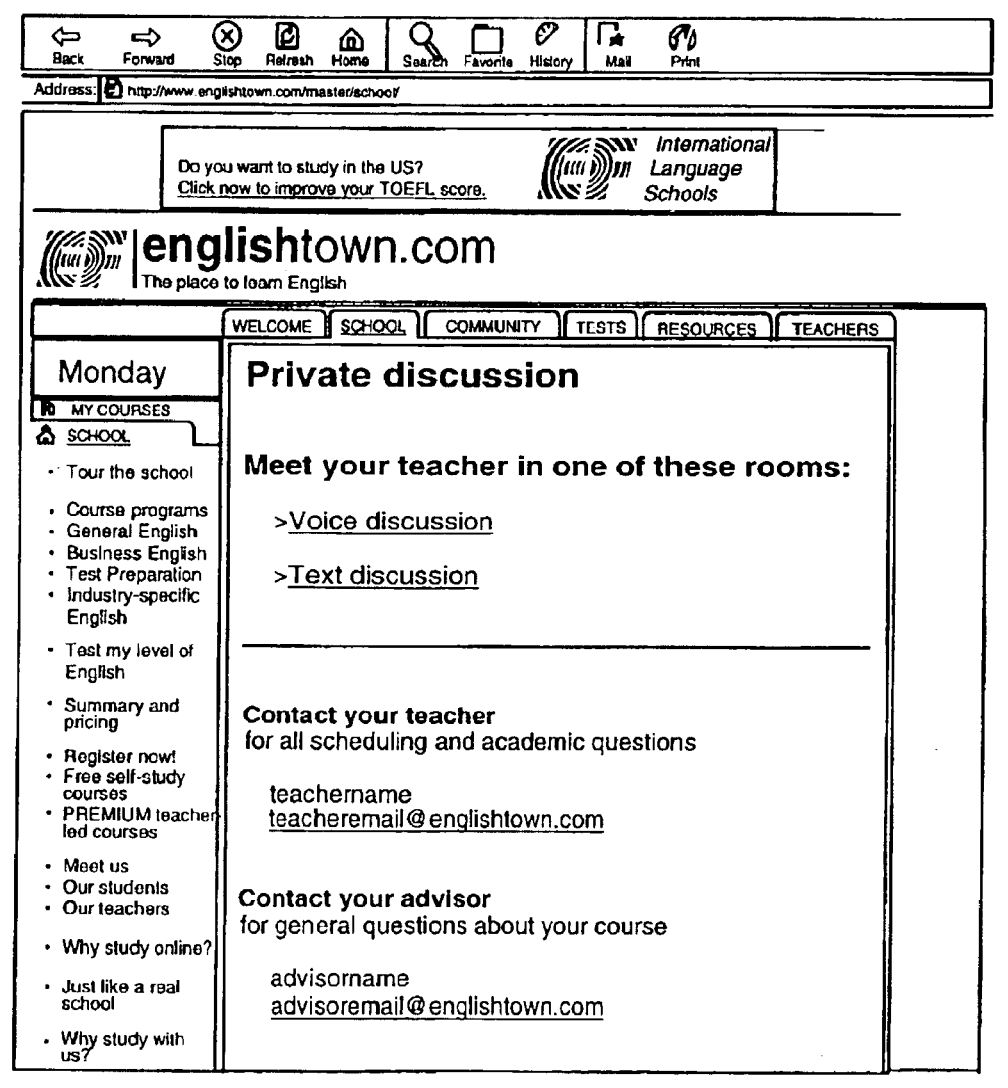

The student can thereafter start the first teaching unit of the private course. To access the private course, the student accesses a particular Web page, which has a link to the private course for which the student has registered. After arriving at the private course, the student can click on a link labeled "Private Discussion". As a result, the student receives a new Web page from the server system 18 entitled "Private Discussion". FIG. 3E shows an exemplary view of the Private Discussion Web page. The Private Discussion Web page has specific information for private students, listing the name and e-mail address of the teacher (if assigned) and name and e-mail address of the student's advisor. If a teacher has been assigned to the student, two links appear in the Web page: 1) voice discussion, and 2) text discussion. Both links link to the assigned teacher's private chat classrooms.

If a teacher has not yet been assigned, the student does not see any links to these chat classrooms, nor does the student see a teacher's name and e-mail address. A message indicates that the teacher has not yet been assigned. The links to the teacher's voice and text chat classrooms become active after the teacher selects a student and the student approves the selection by the teacher, as described in more detail below.

FIG. 2B shows an exemplary process by which a teacher who desires to teach a private course selects a student from the list of students registered for that private course. Each private course has one or more teachers who are capable of teaching the private course. In one embodiment, teachers are certified before they can conduct the private course. The online private education system maintains various information about the teachers: for example, names, home and e-mail addresses, private course(s) assigned to the teachers, and, optionally, the teachers' preferred day(s) of the week and times of the day for teaching a private course.

A teacher using the client system 14 runs the browser and accesses (step 140) the Web site having the online private instruction system. Each private teacher has access to a tool, which appears in a navigational bar called "Private". Clicking on "Private" causes a view with three links to appear: 1) "New students", 2) "My students", and 3) "All students". The online private instruction system limits access to each of these links to those who have need of access (i.e., teachers and administrators).

Activating the "New students" link causes (step 144) to appear on the screen a list of new private students who have registered for a private course, and who do not yet have an assigned teacher. FIG. 4A shows an exemplary view of the "New Private Students" page listing four new private students, A. Fun, A. Crazy, L. Wexler and A. Student, for three different private courses called "Beginner B", "Intermediate A", and "Elementary C". The New-private-students list provides the student's username, private course, country, and date of enrollment for each student. Students are listed in order of enrollment date, the oldest first. In other embodiments, the order of students in the New-private-students list can be based on other criterion (e.g., by country, by alphabetical order). Teachers can select a student from any position in the list (i.e., the teacher does not need to take the oldest record in the list). In another embodiment, teachers are required to select the student at the top of the list. Selecting a student's name (step 148) from the New-private-students list causes a pop-up window to appear that contains the student's information including username, course, test score (if available), date enrolled, city (if available), country, age, gender, e-mail address, and scheduling preferences (e.g., chat room type, days, times of day).

The New-private-students list is the pool from which private teachers, who are geographically dispersed world wide, can select a student for teaching a private course. In effect, the private teachers compete against each other to procure students for themselves.

In one embodiment, the list of students in the New-private-students list spans all private courses supported by the online private instruction system. In another embodiment, the online private instruction system can maintain a plurality of New-private-students lists, one list for each different private course, with each student in a given New-private-students list being enrolled in the same private course.

After viewing the student information, the teacher accepts (step 152) the student for the private course. In general, the teacher selects the student because the student's scheduling preferences are compatible with the teacher's teaching preferences. To accept the student, the teacher clicks on the accept button on the teacher's display screen. A confirmation window can then appear requesting that the teacher confirm the commitment to teach the private course to the selected student. Upon confirmation, the online private instruction system removes (step 156) the selected student from the queue (i.e., the New-private-students list).

Alternatively, the teacher can choose to cancel and thereby choose not to teach that particular student. This causes the window with the student's information to close. The teacher can then select and open another student's record.

After a teacher accepts a particular student, the student record moves to the "All students" section. Only administrators can access the "All students" section. The teacher also receives e-mail having the student's profile information. This information can be helpful if the teacher is unable to reach the server system 18 and, for example, needs to have the students' e-mail address.

Each teacher of a private course can also view the list of students being taught by that teacher by selecting the "My students" link. Administrators can also access the "My students" page. FIG. 4B shows an exemplary view of the "My students" page for a Private Teacher named Alena having two students, L. Wexler and A. Student, for two different private courses. The teacher can access a course record for each listed student. FIG. 4C shows an example of a student profile for the student L. Wexler. In addition to the student's profile information, the student profile has a region 220 for notes by the teacher about the student's progress in the discussion sessions. The profile also includes a field 224 that indicates the number of lessons completed by the student. After student completes a discussion session, the teacher updates this field 224 to indicate the current the number of lessons completed.

The "My students" page also includes direct access to the voice and text classrooms of the teachers. From the "My students" page, the teacher can communicate with the newly selected student through e-mail (each student's e-mail address appears alongside that student's name in the list). The student has the option to decline the match with this teacher and thus to await contact from another different teacher. With a student's ability to reject a teacher, the online private instruction system encourages what is effectively a free marketplace in which teachers compete against each other and bid for students. The reputations, skills, and cost of teachers are factors that students can take into consideration before accepting an assignment to a teacher. Students can rate and review their teachers online. Consequently, marketplace dynamics can affect the prices that teachers receive for their services.

The teacher sends (step 160) a personalized e-mail to the student suggesting a time to have the first discussion session (based on the scheduling days and time preferences that the student has submitted in the student profile). Through an e-mail exchange, the selected student and the teacher negotiate a mutually agreeable day and time to conduct the first discussion session. Alternatively or in conjunction with the e-mail communications, the teacher can telephone the student (provided the student profile includes the student's telephone number).

The first discussion session typically takes place after the student finishes the first teaching unit. The teacher can set a target date (e.g., in the e-mail message) by which the student should finish the first teaching unit. At the agreed to scheduled day and time of the private discussion session, the teacher accesses the "My students" Web page, from which the teacher has access to the private voice and text chat rooms.

The discussion session lasts for a predefined duration and is based on the subject matter of the first teaching unit of the course. At the end of the discussion session, the teacher sets a target date for the student to finish the second teaching unit, and can schedule a second discussion session. Optionally, the teachers can log the actual time taken to prepare lessons, grade writings, perform administrative duties of setting up meeting times, and to answer student's questions on grammar.

In another embodiment, an administrator using the client system 26 runs the browser and accesses the Web site having the online private instruction system, and performs that task of matching students with teachers. The capability to perform this task can be particularly helpful if teachers are overlooking a particular student in the New-private-students list. The administrator can become aware of this situation, for example, by noticing an aged date of enrollment of the student in the top of the queue (New-private-students list), or if the student informs his or her advisor that some time has passed without having been assigned a teacher.

Figure 5A:
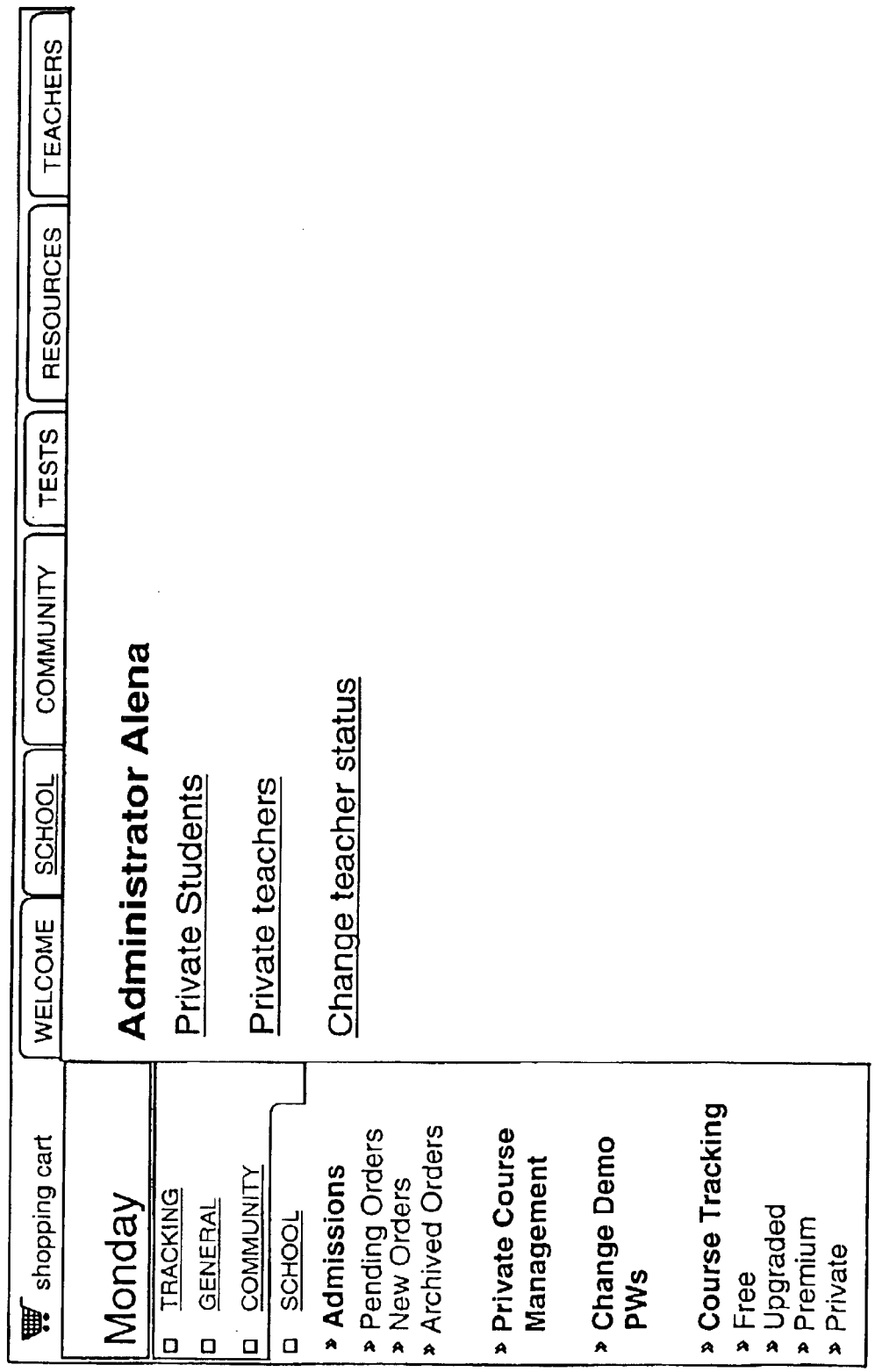

To accomplish the task of matching teachers to students, the administrator has access to a list of teachers who are interested in teaching a private course and a list of students who are registered for a private course. FIG. 5A shows an exemplary view presented to the administrator with three links: 1) "Private Students, 2) Private Teachers, and 3) Change Teacher Status.

By selecting the "Private Students" link, the administrator views a list of students who are registered for a private course. The list indicates whether a student has a private teacher. FIG. 5B shows an exemplary list of private students, one of which, student A. Fun, does not have a private teacher. Clicking on the link to "afun" causes a student record to appear (see FIG. 5C). As shown in FIG. 5C, the record for student A. Fun has a drop-down menu 232 that displays a list of teachers. By comparing the preferences of the teachers with those of a given student, the administrator selects one teacher that produces a match that accommodates both teacher and student. The administrator assigns one of the teachers in the list to the student by selecting the teacher and clicking the assign button 236. E-mail is sent to the teacher and the student informing both of the assignment.

Figure 5D:
Figure 5E:
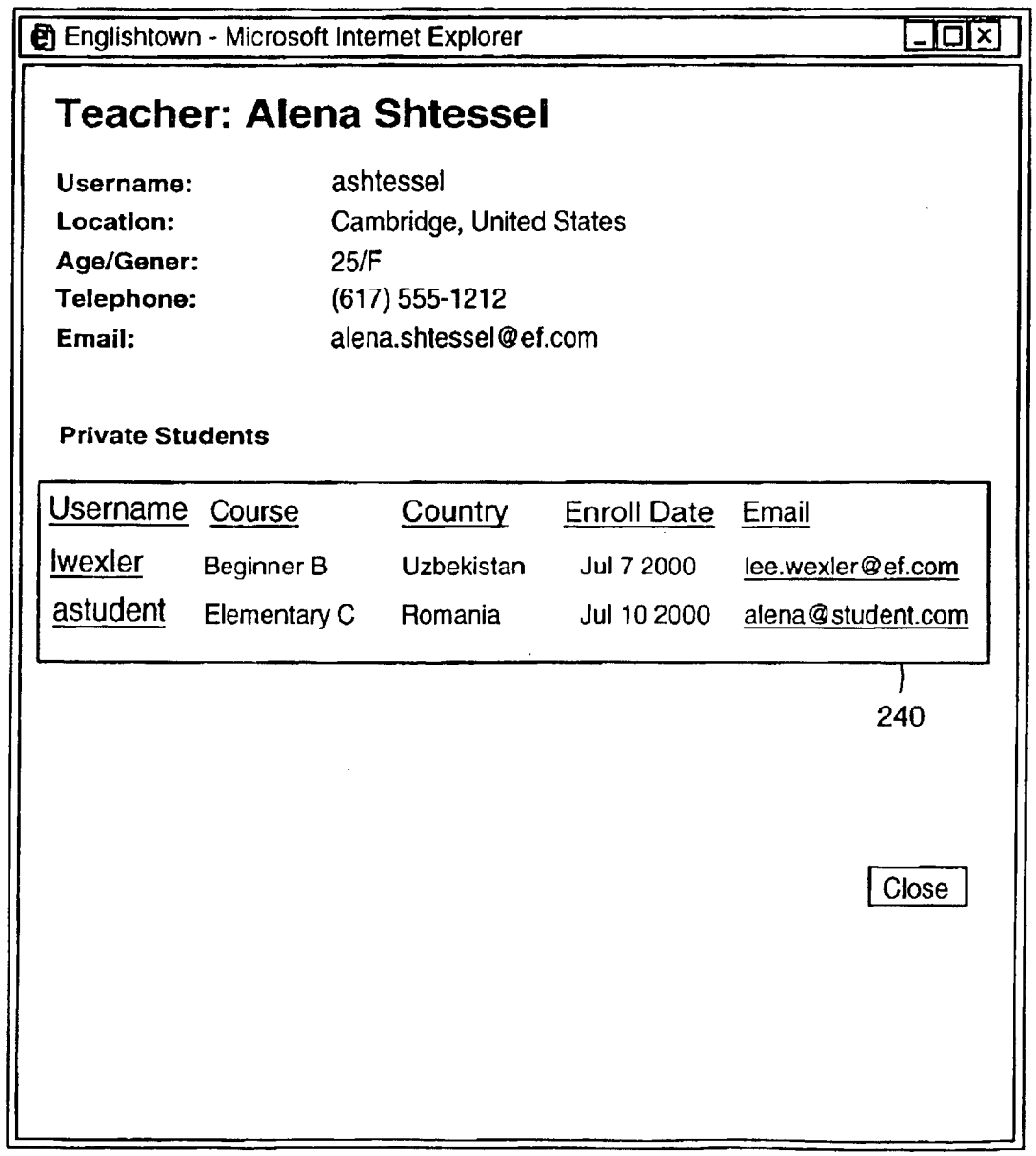

By selecting the "Private Teachers" link, the administrator views a list of private teachers. FIG. 5D shows an exemplary list of private teachers. Clicking on the link of one of the listed teachers causes a teacher record to appear, as shown for example in FIG. 5E. As shown in FIG. 5E, the record for teacher Alena Schtessel has a list of private students 240. In another embodiment, the teacher record also includes a list of teacher preferences for when to teach the private course to facilitate the administrator's decision in looking for a teacher-student match.

By selecting the "Change Teacher Status" link, the administrator views the status of a selected teacher, including such information as the teacher's chatroom name, telephone number, and an indicator whether the teacher is a private teacher. If desired, the administrator is able to change any portion of this status information.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPOM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of facilitating private instruction over a network between a teacher and a student, the method comprising:

receiving profile information associated with a student from a first client system;

transmitting, by a server system, a placement test to the first client system via a network;

registering, by the server system, the student in a course based, at least in part, on responses to the placement test received from the first client system;

arranging at least some of the profile information associated with the registered student in a queue of the server system, the queue further including different profile information associated with at least one other student;

removing the arranged profile information associated with the registered student from the queue in response to selection indicia received from a second client system, the selection indicia being associated with a teacher of the course initiating a discussion session, wherein the first and second client systems exchange at least some messages during the discussion session pertaining to the course independently of the server system.

2. The method of claim 1, wherein the first and second client systems are located in different time zones.

3. The method of claim 1, wherein the responses to the placement test are indicative of the student's proficiency in subject matter associated with the course.

4. The method of claim 1, wherein the second client system is operated by the teacher of the course.

5. The method of claim 1, wherein the second client system is operated by an administrator who matches the student with the teacher.

6. The method of claim 1, wherein the profile information of the registered student identifies a preferred time of day and a preferred day of the week for exchanging messages between the first and second client systems.

7. The method of claim 1, wherein the profile information arranged within the queue of the server system corresponds to students awaiting teacher assignments to the course.

8. The method of claim 1, wherein the messages exchanged between the first and second client systems correspond to at least one of electronic mail messages, voice messages, and text messages.

9. The method of claim 1, wherein the course is intended to teach a language that is not native to the student.

10. The method of claim 1, further comprising:

forming, by the server system, an electronic mail account for the student, wherein the electronic mail account is used to exchange messages between the first and second client systems.

11. The method of claim 10, further comprising:

transmitting, by the server system, information associated with the course to the first client system using the electronic mail account.

12. The method of claim 1, further comprising:

transmitting, by the server system, web page information associated with the course to the first client system.

\* \* \* \* \*